United States Patent [19]

Nanini

[11] 4,180,355
[45] Dec. 25, 1979

[54] DETACHABLE BLADE FOR CUTTING TOOL

[75] Inventor: Antoine Nanini, Vougy-Bonneville, France

[73] Assignee: Societe Igman, Bonneville, France

[21] Appl. No.: 908,290

[22] Filed: May 22, 1978

[30] Foreign Application Priority Data

Jun. 2, 1977 [FR] France .................. 77 16859

[51] Int. Cl.² ............................................ B26D 1/00
[52] U.S. Cl. .................................................. 407/113
[58] Field of Search ............... 407/113, 108, 102, 103, 407/104, 109, 114; 30/339, 351

[56] References Cited

U.S. PATENT DOCUMENTS

| | | | |
|---|---|---|---|
| 2,870,523 | 1/1959 | Richard | 407/113 X |
| 3,636,602 | 1/1972 | Owen | 407/113 |
| 3,701,187 | 10/1972 | Erkfritz | 407/113 X |
| 4,011,049 | 3/1977 | McCreery | 407/113 X |
| 4,068,976 | 1/1978 | Friedline | 407/114 |

Primary Examiner—Jimmy C. Peters
Attorney, Agent, or Firm—J. Harold Nissen

[57] ABSTRACT

A detachable blade for cutting tool has the form of a straight prism of small height, of square cross-section and with side faces presenting trapezoidal teeth.

Said blade is characterized in that each of the front faces of the blade presents a hollow portion in the form of a frustum of a pyramid with a square base, the large base of which is substantially connected to the edges of the front face.

3 Claims, 4 Drawing Figures

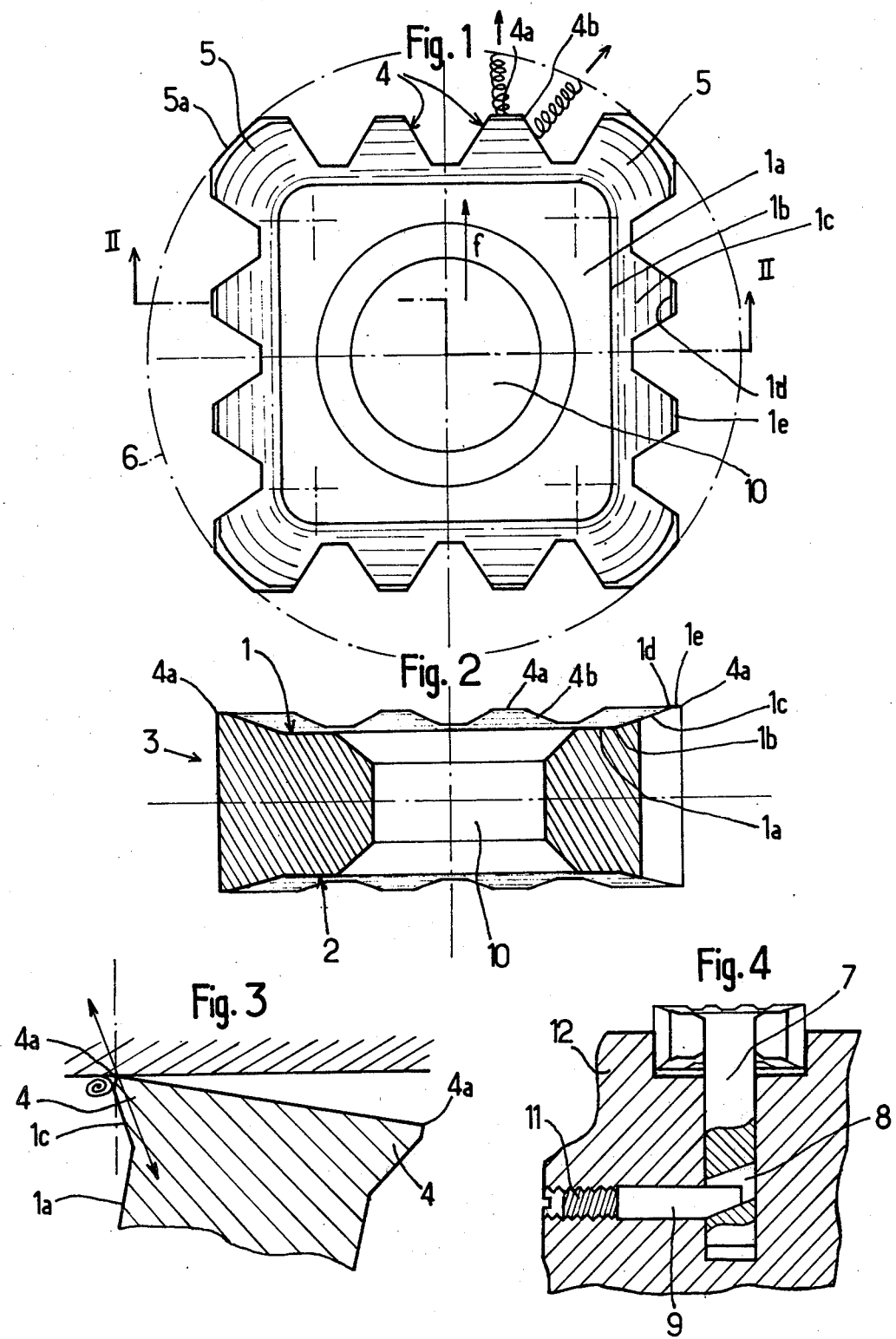

DETACHABLE BLADE FOR CUTTING TOOL

BACKGROUND OF THE INVENTION

The present invention relates to a detachable blade for cutting tool, said blade having the form of a striaght prism of small height, of square cross-section and with side faces presenting trapezoidal teeth.

Detachable blades of this type are already known, preferably made of tungsten carbide, which are removably mounted in housings provided in rotary cutting tools, in which housings they are blocked. These detachable blades offer the advantage that each of their eight main edges, determined at the intersection of their front faces and their side faces, may be used as cutting edge. To this end, it suffices, when one of these edges is worn, to unblock the blade from its housing and change its position so that a fresh edge is in cutting position.

In view of the working conditions of the heretofore known blades whose front faces are flat and are entirely perpendicular to the side faces, it was necessary for them to cut negatively, to allow the successive use of the eight main edges of the blade. Now, machining by negative cut proves to be less advantageous than machining by positive cut. Furthermore, the known blades present flat surfaces in their corners, this rendering these zones particularly sensitive to wear.

SUMMARY OF THE INVENTION

It is an object of the present invention to remedy the drawbacks of these known detachable blades, due to a particularly simple design thereof.

To this end, this detachable blade for cutting tool, said blade having the form of a straight prism of small height, of square cross section and with side faces presenting trapezoidal teeth, is characterised in that each of the front faces of the blade presents a hollow portion in the form of a frustum of a pyramid with a square base, the large base of which is substantially connected to the edges of the front face.

The large base of the hollow portion of each front face is preferably slightly recessed with respect to the actual edges of the front face in order to form, at the location of each trapezoidal tooth of a side face, a slight flat portion ensuring the connection with said front face.

Due to the arrangement according to the invention, the datachable blade, judiciously inclined in the housing provided in the actual cutting tool, may cut positively in the best possible conditions.

According to a further featur. of the invention, the four teeth formed at the four corners of the blade, each have an outer surface of arcuate cross section, forming part of a circle centered on the axis of the blade. This arrangement enables the corners of the blade to be particularly reinforced.

BRIEF DESCRIPTION OF THE DRAWINGS

The invention will be more readily understood on reading the following description with reference to the accompanying drawings, in which:

FIG. 1 is a view in elevation of a detachable blade for cutting tool according to the invention.

FIG. 2 is a view in section along line II—II of FIG. 1

FIG. 3 is a schemaic view in section illustrating the mode of using the blade according to the invention.

FIG. 4 is a view in section illustrating a mode of blocking the blade in it housing.

DESCRIPTION OF THE PREFERRED EMBODIMENT

Referring now to the drawings, FIGS. 1 and 2 show the blade according to the invention, in the form of a straight prism of small height, of square cross-section, and it comprises two front or tranverse faces 1 and 2, and four short side faces 3. Each of the side faces 3 presents a trapezoidal toothing constituted by a succession of teeth 4 having cross sections in the form of an isosceles trapezium and separated from one another by hollow portions also in the form of isosceles trapeziums. According to the invention each of the front faces 1, 2 of the blade presents a hollow portion in the form of a frustum of a pyramid with square base. As the two faces 1 and 2 are made in the same way, only one of them wll be described, namely the upper front face 1. These upper front face 1 presents, around a central hole 10, a transverse surface 1a that is recessed with respect to the cutting edges defined by the individual edges 4a of the various trapezodial teeth 4. This surface 1a is defined by the inner small base 1b of the frustum of pyramid of which the side surface 1c terminates in the large base 1d located in the transverse plane containing the cutting edges 4a of the various teeth 4. In fact, the large base 1d is not merged with the edges 4a, but flat portions 1e are provided between the large base 1d and the edges 4a, to reinforce the cutting teeth 4 at this spot.

As may be seen in FIG. 1, the central part of each front face is thus hollow and each of the cutting edges 4a of the individual teeth 4 is connected to this central portion firstly by one of the flat portions 1e, then by an inwardly inclined face, constituting a part of the side surface 1c of the frustum of pyramid.

The corners of the frustum of pyramid are preferably rounded to strengthen the resistance in these zones.

According to another feature of the invention, the four teeth 5 which are located at the corners of the blade each present an outer surface 5a of arcuate cross-section, the cross sections of the four outer surfaces themselves being located on the same circle 6 centered on the axis of the blade. In this way, the teeth 5 located at the corners are notably reinforced.

FIG. 3 illustrates the manners in which a blade according to the invention in the form of a frustum of a pyramid in each of its front faces effectively cuts positively.

FIG. 4 illustrated the manner in which a blade may be blocked in its housing. The central hole 10 of the blade is penetrated by a pin 7 with milled-head which is pierced in its lower part with a housing 8 having inclined walls with respct to its axis. Into this housing projects a locking wedge 9 which may be more or less driven in by means of a screw 11. Thus, by driving the wedge 9 in the housing 8 by means of the screw 11, the pin 7 is driven into the housing provided in the tool 12, due to the inclined surfaces in contact, and consequently the blade is efficiently held in operating position.

FIG. 1 schematically shows the manner in which the cutting blade according to the invention operates when it is moved in the direction of arrow f in FIG. 1. Due to the inclined assembly of the cutting blade in its support each of the teeth 4 provokes the formation of two swafts, namely a front swarf cut off by the actual cutting edge 4a and a side swarf which is cut off by one of the side edges 4b of the trapezoidal tooth which attacks the metal obliquely. A relative sliding of this side edge 4b is produced to some extent, which considerably facilitates the penetration into the metal.

This is translated by a very considerable saving of energy, of up to 30%, since the work of the blade is considerably facilitated. The coefficient of friction is notably reduced and no heating results therefrom, therefore the resistance of the blade is much more long-lasting.

What I claim is:

1. A detachable blade for cutting tool, said blade having the form of a straight prism of small height, of square cross section and with side faces having trapezoidal teeth, wherein each of the front faces of the blade presents a hollow portion in the form of a frustum of a pyramid with a square base, the large base of which is substantially connected to the edges of the front face.

2. A blade as claimed in claim 1, wherein the large base formed in each of the front face is slightly recessed with respect to the edges of the front faces so as to form, at the location of each of the trapezoidal teeth, a slight flat portion ensuring the connection with the side face.

3. A blade as claimed in claim 1 wherein the four teeth formed at the four corners of the blade each have an outer surface of arcuate cross-section, these arcs being located on the same circle centered on the axis of the plate.

* * * * *